United States Patent
Sillard et al.

(10) Patent No.: US 6,928,222 B2
(45) Date of Patent: Aug. 9, 2005

(54) DISPERSION MANAGED OPTICAL FIBER

(75) Inventors: Pierre Sillard, Le Chesnay (FR); Lionel Provost, Marcoussis (FR); Florent Beaumont, Conflans Ste Honorine (FR); Ludovic Fleury, Bois d'Arcy (FR); Maxime Gorlier, Paris (FR); Denis Molin, Le Chesnay (FR); Louis-Anne De Montmorillon, Paris (FR); Pascale Nouchi, Maisons-Lafitte (FR)

(73) Assignee: Alcatel, Paris (FR)

( * ) Notice: Subject to any disclaimer, the term of this patent is extended or adjusted under 35 U.S.C. 154(b) by 60 days.

(21) Appl. No.: 10/620,356

(22) Filed: Jul. 17, 2003

(65) Prior Publication Data

US 2004/0013381 A1 Jan. 22, 2004

(30) Foreign Application Priority Data

Jul. 18, 2002 (FR) .................................... 02 09136

(51) Int. Cl.[7] ............................. G02B 6/22; G02B 6/16
(52) U.S. Cl. ...................................... 385/127; 385/123
(58) Field of Search ................................ 385/123–128

(56) References Cited

U.S. PATENT DOCUMENTS

| | | | |
|---|---|---|---|
| 6,396,987 B1 | 5/2002 | de Montmorillon et al. | |
| 6,421,490 B1 * | 7/2002 | Liu ............................. | 385/127 |
| 6,523,368 B2 * | 2/2003 | Lee et al. ...................... | 65/414 |
| 6,535,677 B1 * | 3/2003 | Tanaka et al. ............... | 385/123 |
| 6,633,713 B2 * | 10/2003 | Tirloni et al. ................ | 385/123 |
| 6,760,525 B2 * | 7/2004 | Berkey et al. ............... | 385/123 |
| 2001/0008077 A1 | 7/2001 | Berkey | |
| 2002/0090186 A1 | 7/2002 | Sillard et al. | |
| 2003/0180019 A1 * | 9/2003 | Tirloni ........................ | 385/127 |

FOREIGN PATENT DOCUMENTS

| | | |
|---|---|---|
| EP | 1116697 A2 | 7/2001 |
| WO | WO 99/42869 | 8/1999 |
| WO | WO 01/92928 A2 | 12/2001 |

* cited by examiner

*Primary Examiner*—John D. Lee
*Assistant Examiner*—Sarah Song
(74) *Attorney, Agent, or Firm*—Sughrue Mion, PLLC

(57) ABSTRACT

The dispersion managed optical fiber (1) far use in wavelength division multiplex transmission networks includes longitudinally alternating positive and negative chromatic dispersion optical fiber portions and includes a core having a varying index profile and a cladding having a constant index. Each optical fiber portion (T+, T−) has at a wavelength of 1550 nm a chromatic dispersion whose absolute value is from 1 ps/nm.km to 10 ps/nm.km, a chromatic dispersion slope whose absolute value is less than 0.015 ps/nm$^2$.km, and an effective area greater than 35 $\mu m^2$. The relative effective area difference at a wavelength of 1550 nm between the positive and negative chromatic dispersion optical fiber portions is less than 7%, and each optical fiber portion (T+, T−) has bending losses at a wavelength of 1625 nm less than 0.1 dB for 100 turns with a diameter of 60 mm.

23 Claims, 15 Drawing Sheets

FIG_1
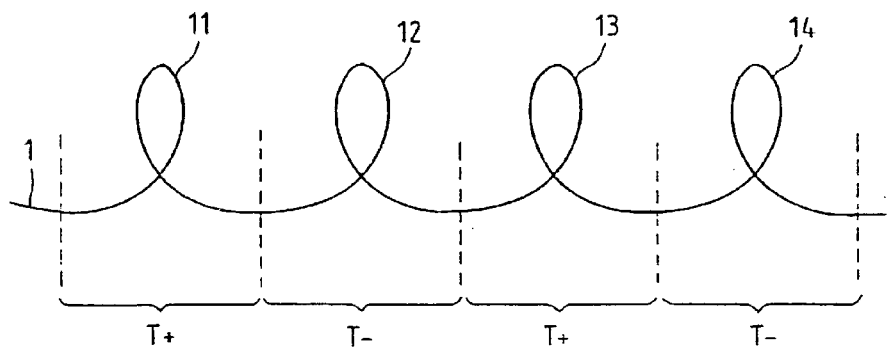
FIG_2
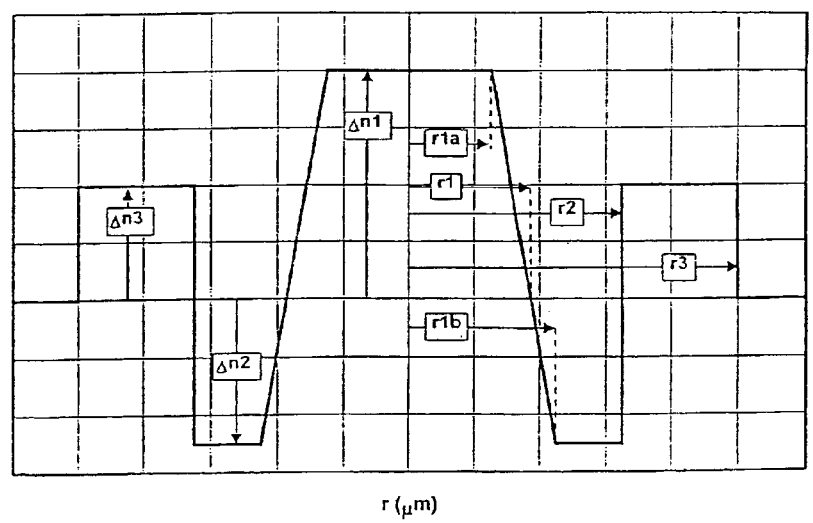

FIG_3

|  | $r_{1a}$ (μm) | $r_1$ (μm) | $r_{1b}$ (μm) | $r_2$ (μm) | $r_3$ (μm) | $10^3 \Delta n_1$ | $10^3 \Delta n_2$ | $10^3 \Delta n_3$ |
|---|---|---|---|---|---|---|---|---|
| 1i | 2.81 | 2.81 | 2.81 | 5.27 | 7.03 | 9.50 | -5.00 | 2.50 |
| 2i | 3.19 | 3.19 | 3.19 | 5.74 | 7.98 | 9.00 | -6.50 | 6.00 |
| 3i | 2.85 | 2.85 | 2.85 | 5.56 | 7.12 | 9.00 | -4.50 | 3.00 |
| 4i | 3.19 | 3.19 | 3.19 | 5.32 | 8.86 | 8.50 | -7.50 | 2.50 |
| 5i | 3.05 | 3.05 | 3.05 | 5.09 | 8.49 | 9.50 | -6.00 | 3.00 |
| 6i | 2.94 | 2.94 | 2.94 | 6.33 | 9.17 | 9.00 | -4.00 | 3.50 |
| 7i | 2.96 | 2.96 | 2.96 | 5.56 | 7.41 | 10.00 | -6.00 | 6.00 |
| 8i | 3.09 | 3.09 | 3.09 | 5.10 | 7.73 | 10.00 | -8.00 | 4.50 |
| 9i | 2.96 | 2.96 | 2.96 | 5.67 | 8.22 | 9.50 | -5.50 | 3.50 |
| 10i | 3.12 | 3.12 | 3.12 | 5.62 | 7.80 | 9.50 | -7.50 | 5.50 |

FIG_4

|  | Var Ray (%) | $\lambda_{cth}$ nm | $2W_{02}$ μm | $S_{eff}$ μm² | $\lambda_0$ nm | C ps/nm-km | C' ps/nm²-km | $PC_{1625}$ dB 100 turns φ=60 mm | $S_{μc}$ |
|---|---|---|---|---|---|---|---|---|---|
| 1a | 0.91% | 1146 | 6.74 | 35.4 | 1478 | 1.0 | 0.0100 | $<3.10^{-4}$ | 0.37 |
| 1b | -0.91% | 1018 | 6.76 | 35.5 | 1764 | -1.0 | 0.0071 | $<2.10^{-3}$ | 0.48 |
| 2a | 0.85% | 1808 | 7.11 | 41.3 | 1434 | 1.0 | 0.0040 | $<3.10^{-7}$ | 0.23 |
| 2b | -0.85% | 1778 | 7.14 | 41.7 | 1662 | -1.0 | 0.0037 | $<2.10^{-6}$ | 0.29 |
| 3a | 2.78% | 1051 | 6.92 | 37.4 | 1416 | 3.0 | 0.0139 | $<5.10^{-4}$ | 0.43 |
| 3b | -2.78% | 996 | 7.00 | 38.0 | 1815 | -3.0 | 0.0060 | $<9.10^{-2}$ | 1.00 |
| 4a | 3.73% | 1727 | 7.00 | 39.5 | 1336 | 5.0 | 0.0015 | $<6.10^{-5}$ | 0.35 |
| 4b | -3.73% | 1604 | 7.10 | 40.7 | 1835 | -5.0 | -0.0142 | $<8.10^{-7}$ | 1.04 |
| 5a | 4.75% | 1801 | 6.96 | 38.7 | 1364 | 5.0 | 0.0148 | $<2.10^{-10}$ | 0.11 |
| 5b | -4.75% | 1639 | 7.10 | 40.0 | 1726 | -5.0 | 0.0133 | $<10^{-7}$ | 0.33 |
| 6a | 3.90% | 1849 | 6.98 | 38.4 | 1357 | 5.0 | 0.0064 | $<4.10^{-4}$ | 0.25 |
| 6b | -3.90% | 1711 | 7.09 | 39.6 | 1828 | -5.0 | -0.0118 | $<9.10^{-3}$ | 0.74 |
| 7a | 4.31% | 1774 | 6.69 | 35.8 | 1352 | 5.0 | 0.0096 | $<6.10^{-11}$ | 0.09 |
| 7b | -4.31% | 1628 | 6.77 | 36.6 | 1787 | -5.0 | 0.0020 | $<3.10^{-6}$ | 0.26 |
| 8a | 6.90% | 1851 | 6.71 | 36.6 | 1314 | 8.0 | 0.0137 | $<9.10^{-14}$ | 0.06 |
| 8b | -6.90% | 1614 | 6.84 | 37.8 | 1785 | -8.0 | 0.0061 | $<5.10^{-6}$ | 0.29 |
| 9a | 6.60% | 1773 | 6.74 | 36.3 | 1321 | 8.0 | 0.0140 | $<3.10^{-9}$ | 0.13 |
| 9b | -6.60% | 1561 | 6.87 | 37.4 | 1853 | -8.0 | -0.0100 | $<9.10^{-3}$ | 0.70 |
| 10a | 6.80% | 1866 | 6.73 | 37.1 | 1298 | 9.5 | 0.0116 | $<7.10^{-11}$ | 0.27 |
| 10b | -6.80% | 1615 | 6.87 | 38.6 | 1833 | -9.5 | -0.0108 | $<3.10^{-3}$ | 0.60 |

FIG_5

|  | $r_{1a}$ (μm) | $r_1$ (μm) | $r_{1b}$ (μm) | $r_2$ (μm) | $r_3$ (μm) | $10^3 \Delta n_1$ | $10^3 \Delta n_2$ | $10^3 \Delta n_3$ |
|---|---|---|---|---|---|---|---|---|
| 11i | 2.98 | 3.11 | 3.21 | 5.08 | 7.53 | 9.45 | -8.85 | 3.70 |
| 12i | 2.54 | 3.02 | 3.28 | 6.05 | 7.90 | 9.95 | -5.30 | 5.65 |
| 13i | 2.80 | 3.09 | 3.22 | 5.85 | 8.36 | 9.20 | -4.20 | 4.35 |
| 14i | 2.79 | 3.07 | 3.29 | 5.39 | 7.38 | 9.15 | -7.35 | 4.20 |
| 15i | 2.43 | 3.08 | 3.35 | 5.69 | 8.82 | 10.00 | -4.25 | 3.35 |

FIG_6

|  | Var Ray (%) | $\lambda_{cth}$ nm | $2W_{02}$ μm | $S_{eff}$ μm² | $\lambda_0$ nm | C ps/nm-km | C' ps/nm²-km | $PC_{1625}$ DB 100 turns φ=60 mm | $S_{\mu c}$ |
|---|---|---|---|---|---|---|---|---|---|
| 11a | 6.47% | 1.682 | 6.66 | 36.1 | 1310 | 8.0 | 0.0103 | <2.10⁻⁹ | 0.12 |
| 11b | -6.47% | 1486 | 6.77 | 37.0 | 1866 | -8.0 | -0.0113 | <7.10⁻³ | 0.66 |
| 12a | 6.49% | 1836 | 6.62 | 34.9 | 1326 | 8.0 | 0.0131 | <2.10⁻¹⁰ | 0.09 |
| 12b | -6.49% | 1621 | 6.74 | 35.8 | 1867 | -8.0 | -0.0153 | <2.10⁻³ | 0.51 |
| 13a | 2.85% | 1808 | 7.14 | 40.3 | 1405 | 3.0 | 0.0128 | <4.10⁻⁸ | 0.18 |
| 13b | -2.85% | 1708 | 7.24 | 41.5 | 1689 | -3.0 | 0.0124 | <2.10⁻⁵ | 0.36 |
| 14a | 2.30% | 1561 | 6.75 | 36.4 | 1371 | 3.0 | 0.0003 | <5.10⁻⁵ | 0.31 |
| 14b | -2.30% | 1491 | 6.79 | 36.9 | 1874 | -3.0 | -0.0096 | <6.10⁻³ | 0.62 |
| 15a | 0.88% | 1806 | 6.86 | 36.7 | 1465 | 1.0 | 0.0070 | <2.10⁻⁸ | 0.15 |
| 15b | -0.88% | 1774 | 6.88 | 36.9 | 1697 | -1.0 | 0.0049 | <2.10⁻⁷ | 0.19 |

FIG_7

| | $S_{eff}$ μm² 1460 nm | $S_{eff}$ μm² 1500 nm | $S_{eff}$ μm² 1625 nm | $S_{eff}$ μm² 1675 nm | C ps/nm·km 1460 nm | C ps/nm·km 1500 nm | C ps/nm·km 1625 nm | C ps/nm·km 1675 nm | PC10mm dB/m 1550 nm | PC10mm dB/m 1625 nm | PC10mm dB/m 1675 nm | PC30mm dB/m 1550 nm | PC30mm dB/m 1625 nm | PC30mm dB/m 1675 nm |
|---|---|---|---|---|---|---|---|---|---|---|---|---|---|---|
| 1a | 31.5 | 33.1 | 39.6 | 43.1 | -0.4 | 0.4 | 1.5 | 1.7 | <5 | <50 | <100 | <1·10-5 | <5·10-3 | <0.01 |
| 1b | 31.4 | 33.1 | 40.1 | 44.0 | -2.1 | -1.5 | -0.7 | -0.5 | <10 | <50 | <150 | <1·10-5 | <5·10-3 | <2 |
| 2a | 36.3 | 38.3 | 47.2 | 52.2 | 0.4 | 0.7 | 1.4 | 1.9 | <5 | <50 | <50 | <1·10-5 | <1·10-4 | <1·10-3 |
| 2b | 36.3 | 38.5 | 48.2 | 53.7 | -1.5 | -1.2 | -0.5 | 0.3 | <5 | <50 | <50 | <1·10-5 | <1·10-4 | <1·10-3 |
| 3a | 33.4 | 35.0 | 41.6 | 45.2 | 1.2 | 2.2 | 3.8 | 4.1 | <5 | <50 | <100 | <1·10-5 | <5·10-3 | <0.05 |
| 3b | 33.1 | 35.1 | 43.6 | 48.5 | -3.9 | -3.4 | -2.7 | -2.4 | <50 | <200 | <600 | <5·10-4 | -0.1 | <2 |
| 4a | 35.6 | 37.2 | 43.9 | 47.8 | 4.1 | 4.7 | 4.7 | 4.2 | <5 | <50 | <100 | <1·10-5 | <1·10-4 | <1·10-3 |
| 4b | 35.0 | 37.2 | 47.8 | 54.2 | -4.1 | -4.4 | -6.0 | -6.1 | <50 | <250 | <600 | <5·10-4 | <0.1 | <2 |
| 5a | 34.8 | 36.4 | 42.8 | 46.2 | 3.3 | 4.2 | 5.9 | 6.5 | <5 | <50 | <50 | <1·10-5 | <1·10-4 | <1·10-3 |
| 5b | 34.3 | 36.6 | 46.4 | 51.9 | -6.0 | -5.6 | -3.7 | -2.2 | <5 | <50 | <50 | <1·10-5 | <1·10-4 | <1·10-3 |
| 6a | 34.6 | 36.1 | 42.7 | 46.4 | 3.7 | 4.5 | 5.0 | 4.7 | <5 | <50 | <50 | <1·10-5 | <1·10-4 | <1·10-3 |
| 6b | 34.1 | 36.3 | 46.5 | 52.7 | -4.4 | -4.5 | -5.8 | -5.8 | <20 | <150 | <600 | <5·10-4 | <0.05 | <2 |
| 7a | 32.4 | 33.8 | 39.5 | 42.6 | 3.6 | 4.4 | 5.5 | 5.7 | <5 | <50 | <50 | <1·10-5 | <1·10-4 | <1·10-3 |
| 7b | 31.7 | 33.6 | 42.2 | 47.0 | -5.2 | -5.1 | -4.7 | -4.0 | <5 | <50 | <50 | <1·10-5 | <1·10-4 | <1·10-3 |
| 8a | 33.5 | 34.8 | 39.9 | 42.6 | 6.2 | 7.2 | 8.7 | 9.0 | <5 | <50 | <50 | <1·10-5 | <1·10-4 | <1·10-3 |
| 8b | 32.3 | 34.5 | 44.3 | 49.9 | -8.3 | -8.2 | -7.1 | -5.7 | <5 | <50 | <50 | <1·10-5 | <1·10-4 | <1·10-3 |
| 9a | 33.2 | 34.5 | 39.6 | 42.3 | 6.1 | 7.1 | 8.6 | 8.7 | <5 | <50 | <50 | <1·10-5 | <1·10-4 | <1·10-3 |
| 9b | 32.0 | 34.1 | 44.0 | 49.8 | -7.3 | -7.5 | -8.5 | -8.3 | <15 | <150 | <600 | <5·10-4 | <0.05 | <2 |
| 10a | 34.0 | 35.2 | 40.1 | 42.8 | 7.7 | 8.7 | 9.9 | 9.9 | <5 | <50 | <50 | <1·10-5 | <1·10-4 | <1·10-3 |
| 10b | 32.5 | 34.8 | 45.7 | 52.3 | -8.3 | -8.8 | -9.9 | -9.2 | <15 | <100 | <600 | <1·10-5 | <5·10-3 | <2 |

FIG_8

| | $S_{eff}$ µm² 1460 nm | $S_{eff}$ µm² 1500 nm | $S_{eff}$ µm² 1625 nm | $S_{eff}$ µm² 1675 nm | C ps/nm·km 1460 nm | C ps/nm·km 1500 nm | C ps/nm·km 1625 nm | C ps/nm·km 1675 nm | PC10mm dB/m 1550 nm | PC10mm dB/m 1625 nm | PC10mm dB/m 1675 nm | PC30mm dB/m 1550 nm | PC30mm dB/m 1625 nm | PC30mm dB/m 1675 nm |
|---|---|---|---|---|---|---|---|---|---|---|---|---|---|---|
| 11a | 33.1 | 34.3 | 39.4 | 42.1 | 6.4 | 7.3 | 8.4 | 8.3 | <5 | <50 | <50 | <1.10⁻⁵ | <1.10⁻⁴ | <1.10⁻³ |
| 11b | 31.8 | 33.9 | 43.4 | 49.1 | -7.1 | -7.4 | -8.6 | -8.5 | <15 | <100 | <600 | <0.00005 | <0.05 | <2.0 |
| 12a | 32.0 | 33.2 | 38.1 | 40.7 | 6.1 | 7.1 | 8.6 | 8.5 | <5 | <50 | <50 | <1.10⁻³ | <1.10⁻⁴ | <1.10⁻³ |
| 12b | 30.7 | 32.8 | 42.1 | 47.7 | -7.0 | -7.3 | -8.9 | -9.0 | <10 | <100 | <200 | <1.10⁻³ | <5.10⁻³ | <2.0 |
| 13a | 35.8 | 37.7 | 45.3 | 49.5 | 1.5 | 2.3 | 3.9 | 4.6 | <5 | <50 | <50 | <1.10⁻³ | <1.10⁻⁴ | <1.10⁻³ |
| 13b | 35.7 | 38.0 | 48.1 | 53.8 | -4.1 | -3.6 | -1.8 | -0.4 | <5 | <50 | <100 | <1.10⁻³ | <1.10⁻⁴ | <1.10⁻³ |
| 14a | 32.7 | 34.2 | 40.6 | 44.3 | 2.3 | 2.8 | 2.7 | 2.3 | <5 | <50 | <100 | <1.10⁻³ | <1.10⁻⁴ | <5.10⁻³ |
| 14b | 32.3 | 34.1 | 42.4 | 47.2 | -2.7 | -2.7 | -3.8 | -4.3 | <15 | <100 | <600 | <0.00005 | <0.05 | <2.0 |
| 15a | 32.5 | 34.2 | 41.3 | 45.2 | -0.1 | 0.5 | 1.4 | 1.7 | <5 | <50 | <50 | <1.10⁻³ | <1.10⁻⁴ | <1.10⁻³ |
| 15b | 32.4 | 34.2 | 41.9 | 46.2 | -1.8 | -1.3 | -0.7 | -0.3 | <5 | <50 | <50 | <1.10⁻³ | <1.10⁻⁴ | <1.10⁻³ |

FIG_9

| | $S_{eff}$ | $S_{eff}$ | $S_{eff}$ | $S_{eff}$ | $\Delta S_{eff}$ | C | C | C | C | C | $\Delta C$ |
|---|---|---|---|---|---|---|---|---|---|---|---|
| | µm² | µm² | µm² | µm² | µm² | ps/nm·km | ps/nm·km | ps/nm·km | ps/nm·km | ps/nm·km | ps/nm·km |
| | 1460 nm | 1500 nm | 1625 nm | 1675 nm | From 1460 nm to 1625 nm | 1460 nm | 1500 nm | 1550 nm | 1625 nm | 1675 nm | From 1460 nm to 1625 nm |
| 1m | 31.5 | 33.1 | 39.9 | 43.6 | 8.4 | -1.25 | -0.56 | 0.0 | 0.42 | 0.58 | 1.7 |
| 2m | 36.3 | 38.4 | 47.7 | 53.0 | 11.4 | -0.55 | -0.23 | 0.0 | 0.43 | 1.11 | 1.0 |
| 3m | 33.2 | 35.0 | 42.6 | 46.9 | 9.4 | -1.34 | -0.62 | 0.0 | 0.55 | 0.85 | 1.9 |
| 4m | 35.3 | 37.2 | 45.9 | 51.0 | 10.6 | 0.03 | 0.18 | 0.0 | -0.64 | -0.95 | -0.7 |
| 5m | 34.6 | 36.5 | 44.6 | 49.1 | 10.0 | -1.38 | -0.71 | 0.0 | 1.12 | 2.13 | 2.5 |
| 6m | 34.3 | 36.2 | 44.6 | 49.6 | 10.3 | -0.38 | -0.04 | 0.0 | -0.38 | -0.56 | 0.0 |
| 7m | 32.0 | 33.7 | 40.8 | 44.8 | 8.8 | -0.81 | -0.35 | 0.0 | 0.40 | 0.83 | 1.2 |
| 8m | 32.9 | 34.6 | 42.1 | 46.3 | 9.2 | -1.02 | -0.51 | 0.0 | 0.83 | 1.65 | 1.9 |
| 9m | 32.6 | 34.3 | 41.8 | 46.1 | 9.2 | -0.62 | -0.22 | 0.0 | 0.07 | 0.22 | 0.7 |
| 10m | 33.2 | 35.0 | 42.9 | 47.5 | 9.7 | -0.31 | -0.07 | 0.0 | 0.04 | 0.32 | 0.3 |
| 11m | 32.4 | 34.1 | 41.4 | 45.6 | 9.0 | -0.36 | -0.08 | 0.0 | -0.12 | -0.08 | 0.2 |
| 12m | 31.3 | 33.0 | 40.1 | 44.2 | 8.7 | -0.48 | -0.11 | 0.0 | -0.17 | -0.22 | 0.3 |
| 13m | 35.8 | 37.8 | 46.7 | 51.7 | 11.0 | -1.32 | -0.66 | 0.0 | 1.06 | 2.07 | 2.4 |
| 14m | 32.5 | 34.2 | 41.5 | 45.7 | 9.0 | -0.18 | 0.06 | 0.0 | -0.58 | -1.02 | -0.4 |
| 15m | 32.5 | 34.2 | 41.6 | 45.7 | 9.1 | -0.96 | -0.41 | 0.0 | 0.35 | 0.69 | 1.3 |

FIG_10
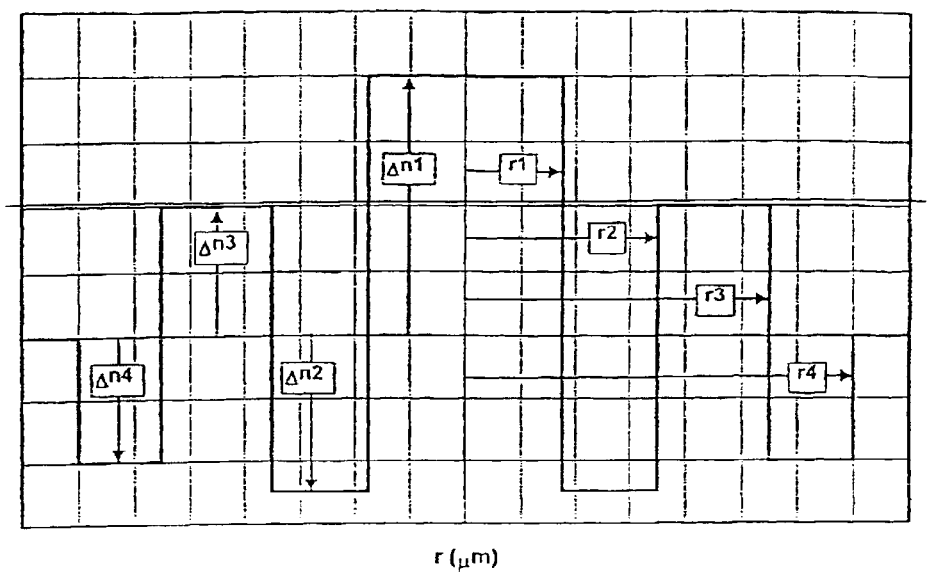
r (μm)
FIG_11
|  | $r_1$ (μm) | $r_2$ (μm) | $r_3$ (μm) | $r_4$ (μm) | $10^3 \Delta n_1$ | $10^3 \Delta n_2$ | $10^3 \Delta n_3$ | $10^3 \Delta n_4$ |
|---|---|---|---|---|---|---|---|---|
| 16i | 2.74 | 6.93 | 11.70 | 14.44 | 9.50 | -2.50 | 3.00 | -4.50 |
| 17i | 3.06 | 4.90 | 11.04 | 12.24 | 9.80 | -6.80 | 2.21 | -3.59 |
| 18i | 3.21 | 5.70 | 9.13 | 13.44 | 8.86 | -7.70 | 5.00 | -3.00 |
| 19i | 2.90 | 6.21 | 11.17 | 13.79 | 9.50 | -3.50 | 3.00 | -3.50 |
| 20i | 3.29 | 5.74 | 10.40 | 11.95 | 8.00 | -6.50 | 3.00 | -3.50 |
| 21i | 3.00 | 5.57 | 11.14 | 14.29 | 9.50 | -4.00 | 3.00 | -5.00 |
| 22i | 2.67 | 6.32 | 12.22 | 14.05 | 9.50 | -3.00 | 1.50 | -5.00 |
| 23i | 2.78 | 6.36 | 11.13 | 13.25 | 9.50 | -4.00 | 2.50 | -4.50 |
| 24i | 3.29 | 5.74 | 10.40 | 11.96 | 8.00 | -6.50 | 3.00 | -3.50 |
| 25i | 3.07 | 5.87 | 10.67 | 13.34 | 9.30 | -5.80 | 3.80 | -7.60 |

FIG_12

| | Var Ray (%) | $\lambda_{ch}$ nm | $2W_{02}$ μm | $S_{eff}$ μm² | $\lambda_0$ nm | C ps/nm-km | C' ps/nm²·km | $PC_{1625}$ dB 100 turns φ=60 mm | $S_{pc}$ |
|---|---|---|---|---|---|---|---|---|---|
| 16a | 2.60% | 1695 | 6.97 | 37.5 | 1411 | 3.0 | 0.0094 | <2·10⁻¹⁰ | 0.23 |
| 16b | -2.60% | 1610 | 7.04 | 38.3 | 1748 | -3.0 | 0.0011 | <10⁻⁷ | 0.45 |
| 17a | 6.03% | 1848 | 6.81 | 37.1 | 1330 | 7.0 | 0.130 | <8·10⁻¹⁷ | 0.08 |
| 17b | -6.03% | 1640 | 6.94 | 38.3 | 1780 | -7.0 | 0.0026 | <3·10⁻⁷ | 0.3 |
| 18a | 4.26% | 1659 | 6.96 | 40.0 | 1328 | 5.0 | 0.0048 | <2·10⁻¹¹ | 0.21 |
| 18b | -4.26% | 1525 | 7.09 | 42.2 | 1700 | -5.0 | 0.0117 | <4·10⁻⁵ | 0.64 |
| 19a | 5.06% | 1790 | 6.94 | 37.8 | 1351 | 6.0 | 0.0005 | <2·10⁻¹³ | 0.13 |
| 19b | -5.06% | 1619 | 7.07 | 39.4 | 1763 | -6.0 | -0.0001 | <6·10⁻⁶ | 0.45 |
| 20a | 2.35% | 1698 | 7.31 | 43.4 | 1359 | 3.0 | -0.0006 | <7·10⁻⁷ | 0.55 |
| 20b | -2.35% | 1621 | 7.41 | 44.9 | 1731 | -3.0 | -0.0034 | <2·10⁻³ | 1.09 |
| 21a | 0.97% | 1707 | 7.13 | 40.1 | 1476 | 1.0 | 0.0124 | <3·10⁻¹³ | 0.16 |
| 21b | -0.97% | 1675 | 7.16 | 40.5 | 1612 | -1.0 | 0.0134 | <7·10⁻¹⁰ | 0.19 |
| 22a | 2.73% | 1295 | 6.81 | 35.7 | 1422 | 3.0 | 0.0135 | <3·10⁻⁸ | 0.34 |
| 22b | -2.73% | 1228 | 6.88 | 36.2 | 1793 | -3.0 | 0.0036 | <9·10⁻⁴ | 0.77 |
| 23a | 4.84% | 1531 | 6.70 | 35.1 | 1352 | 6.0 | 0.0114 | <3·10⁻¹⁰ | 0.21 |
| 23b | -4.84% | 1391 | 6.79 | 35.9 | 1852 | -6.0 | -0.0124 | <3·10⁻³ | 0.9 |
| 24a | 3.13% | 1712 | 7.31 | 43.4 | 1345 | 4.0 | 0.0008 | <3·10⁻⁷ | 0.49 |
| 24b | -3.13% | 1609 | 7.43 | 45.3 | 1738 | -4.0 | -0.0025 | <4·10⁻³ | 1.22 |
| 25a | 6.46% | 1731 | 6.9 | 38.1 | 1311 | 8.0 | 0.0090 | <2·10⁻¹⁴ | 0.12 |
| 25b | -6.46% | 1523 | 7.0 | 40.4 | 1728 | -8.0 | 0.0118 | <3·10⁻⁵ | 0.62 |

FIG_13

| | $S_{eff}$ μm² 1460 nm | $S_{eff}$ μm² 1500 nm | $S_{eff}$ μm² 1625 nm | $S_{eff}$ μm² 1675 nm | C ps/nm·km 1460 nm | C ps/nm·km 1500 nm | C ps/nm·km 1625 nm | C ps/nm·km 1675 nm | PC10mm dB/m 1550 nm | PC10mm dB/m 1625 nm | PC10mm dB/m 1675 nm | PC30mm dB/m 1550 nm | PC30mm dB/m 1625 nm | PC30mm dB/m 1675 nm |
|---|---|---|---|---|---|---|---|---|---|---|---|---|---|---|
| 16a | 33.5 | 35.1 | 42.0 | 45.9 | 1.5 | 2.3 | 3.4 | 3.6 | <5 | <50 | <50 | <1·10⁻⁵ | <1·10⁻⁴ | <1·10⁻³ |
| 16b | 33.2 | 35.3 | 44.3 | 49.5 | -3.5 | -3.2 | -2.8 | -2.2 | <5 | <50 | <100 | <1·10⁻⁵ | <5·10⁻³ | <0.01 |
| 17a | 33.3 | 34.7 | 39.9 | 42.8 | 5.2 | 6.2 | 7.7 | 7.9 | <5 | <50 | <50 | <1·10⁻⁵ | <1·10⁻⁴ | <1·10⁻³ |
| 17b | 32.2 | 34.3 | 43.7 | 49.0 | -7.1 | -7.1 | -6.4 | -5.3 | <5 | <50 | <50 | <1·10⁻⁵ | <1·10⁻⁴ | <1·10⁻³ |
| 18a | 35.9 | 37.5 | 44.8 | 48.9 | 4.2 | 4.7 | 5.3 | 5.7 | <5 | <50 | <50 | <1·10⁻⁵ | <1·10⁻⁴ | <1·10⁻³ |
| 18b | 35.7 | 38.3 | 49.9 | 56.4 | -5.5 | -5.4 | -3.4 | -1.4 | <5 | <50 | <100 | <1·10⁻⁵ | <5·10⁻³ | <0.05 |
| 19a | 34.2 | 35.7 | 41.8 | 45.1 | 4.3 | 5.2 | 6.5 | 6.6 | <5 | <50 | <50 | <1·10⁻⁵ | <1·10⁻⁴ | <1·10⁻³ |
| 19b | 33.6 | 35.9 | 46.2 | 52.2 | -6.0 | -6.0 | -5.5 | -4.3 | <5 | <50 | <100 | <1·10⁻⁵ | <5·10⁻³ | <5·10⁻³ |
| 20a | 38.5 | 40.5 | 49.4 | 54.7 | 2.5 | 2.9 | 2.9 | 2.9 | <10 | <50 | <150 | <1·10⁻⁵ | <5·10⁻³ | <0.05 |
| 20b | 38.4 | 40.9 | 53.0 | 60.2 | -2.8 | -2.8 | -2.9 | -2.0 | <50 | <200 | <600 | <5·10⁻⁴ | <0.05 | <2.0 |
| 21a | 35.4 | 37.3 | 45.5 | 50.0 | -0.3 | 0.3 | 2.1 | 3.2 | <5 | <50 | <50 | <1·10⁻⁵ | <1·10⁻⁴ | <1·10⁻³ |
| 21b | 35.3 | 37.4 | 46.4 | 51.3 | -2.2 | -1.6 | 0.3 | 1.8 | <5 | <50 | <50 | <1·10⁻⁵ | <1·10⁻⁴ | <1·10⁻³ |
| 22a | 32.0 | 33.5 | 39.7 | 43.1 | 1.2 | 2.1 | 3.7 | 3.9 | <5 | <50 | <50 | <1·10⁻⁵ | <1·10⁻⁴ | <5·10⁻³ |
| 22b | 31.6 | 33.5 | 41.5 | 46.1 | -3.8 | -3.3 | -2.8 | -2.6 | <15 | <100 | <200 | <1·10⁻⁵ | <0.05 | <2.0 |
| 23a | 31.9 | 33.2 | 38.6 | 41.6 | 4.3 | 5.2 | 6.3 | 6.1 | <5 | <50 | <50 | <1·10⁻⁵ | <1·10⁻⁴ | <1·10⁻³ |
| 23b | 31.0 | 33.0 | 41.8 | 47.1 | -5.3 | -5.5 | -6.9 | -7.0 | <20 | <150 | <600 | <5·10⁻⁴ | <0.1 | <2.0 |
| 24a | 38.6 | 40.5 | 49.0 | 54.0 | 3.3 | 3.8 | 3.9 | 3.9 | <10 | <50 | <150 | <1·10⁻⁵ | <5·10⁻³ | <0.01 |
| 24b | 38.4 | 41.1 | 53.7 | 61.4 | -3.7 | -3.8 | -3.7 | -2.6 | <50 | <250 | <600 | <5·10⁻⁴ | <0.1 | <2.0 |
| 25a | 34.7 | 36.0 | 41.7 | 44.9 | 6.5 | 7.4 | 8.3 | 8.4 | <5 | <50 | <50 | <1·10⁻⁵ | <1·10⁻⁴ | <1·10⁻³ |
| 25b | 33.9 | 36.5 | 48.2 | 54.9 | -8.3 | -8.3 | -6.1 | -3.6 | <5 | <50 | <100 | <1·10⁻⁵ | <5·10⁻³ | <0.05 |

FIG_14

| | $S_{eff}$ μm² 1460 nm | $S_{eff}$ μm² 1500 nm | $S_{eff}$ μm² 1625 nm | $S_{eff}$ μm² 1675 nm | $\Delta S_{eff}$ μm² From 1460 nm to 1625 nm | C ps/nm·km 1460 nm | C ps/nm·km 1500 nm | C ps/nm·km 1625 nm | C ps/nm·km 1675 nm | $\Delta C$ ps/nm·km From 1460 nm to 1625 nm |
|---|---|---|---|---|---|---|---|---|---|---|
| 16m | 33.4 | 35.2 | 43.2 | 47.7 | 9.8 | -1.02 | -0.41 | 0.30 | 0.67 | 1.3 |
| 17m | 32.8 | 34.5 | 41.8 | 45.9 | 9.0 | -0.98 | -0.46 | 0.65 | 1.33 | 1.6 |
| 18m | 35.8 | 37.9 | 47.3 | 52.7 | 11.6 | -0.66 | -0.35 | 0.94 | 2.13 | 1.6 |
| 19m | 33.9 | 35.8 | 44.0 | 48.7 | 10.1 | -0.87 | -0.37 | 0.50 | 1.15 | 1.4 |
| 20m | 38.4 | 40.7 | 51.2 | 57.5 | 12.8 | -0.12 | 0.04 | 0.00 | 0.47 | 0.1 |
| 21m | 35.3 | 37.3 | 45.9 | 50.7 | 10.6 | -1.25 | -0.65 | 1.20 | 2.48 | 2.5 |
| 22m | 31.8 | 33.5 | 40.6 | 44.6 | 8.8 | -1.33 | -0.58 | 0.43 | 0.66 | 1.8 |
| 23m | 31.5 | 33.1 | 40.2 | 44.4 | 8.8 | -0.53 | -0.12 | -0.28 | -0.45 | 0.2 |
| 24m | 38.5 | 40.8 | 51.4 | 57.7 | 12.9 | -0.19 | -0.01 | 0.11 | 0.65 | 0.3 |
| 25m | 34.3 | 36.3 | 45.0 | 49.9 | 10.7 | -0.87 | -0.47 | 1.11 | 2.39 | 2.0 |

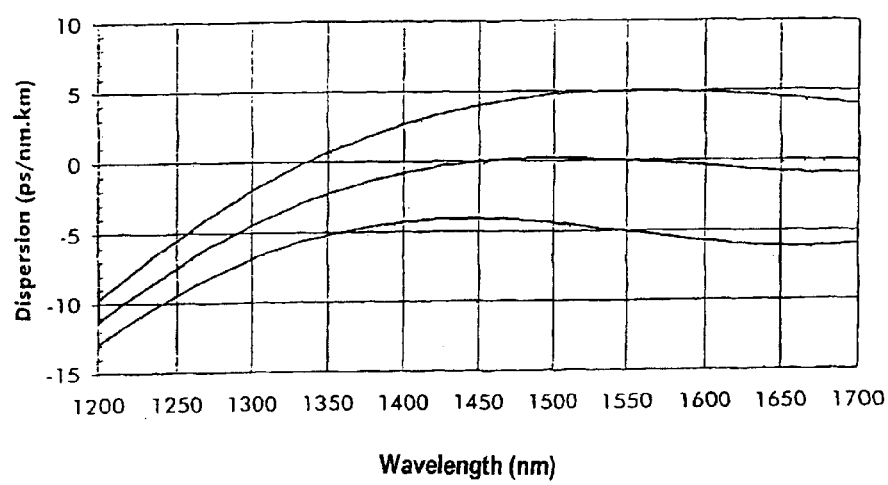
FIG_15
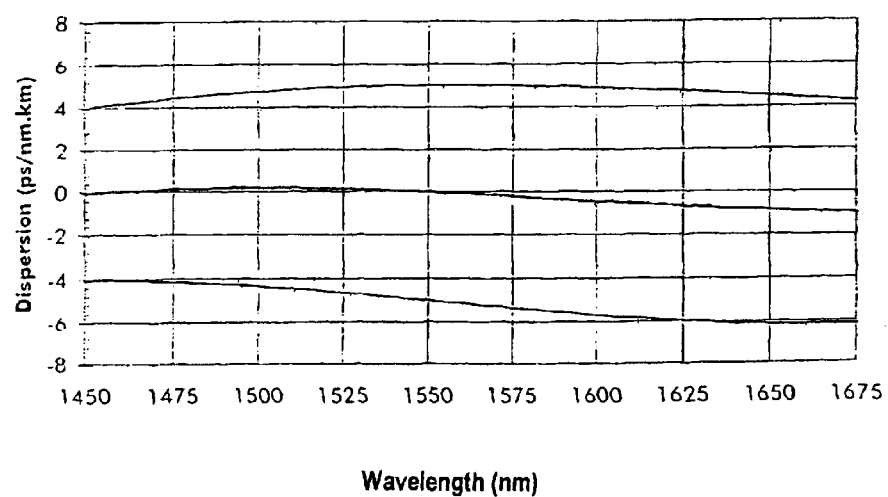
FIG_16

FIG_17
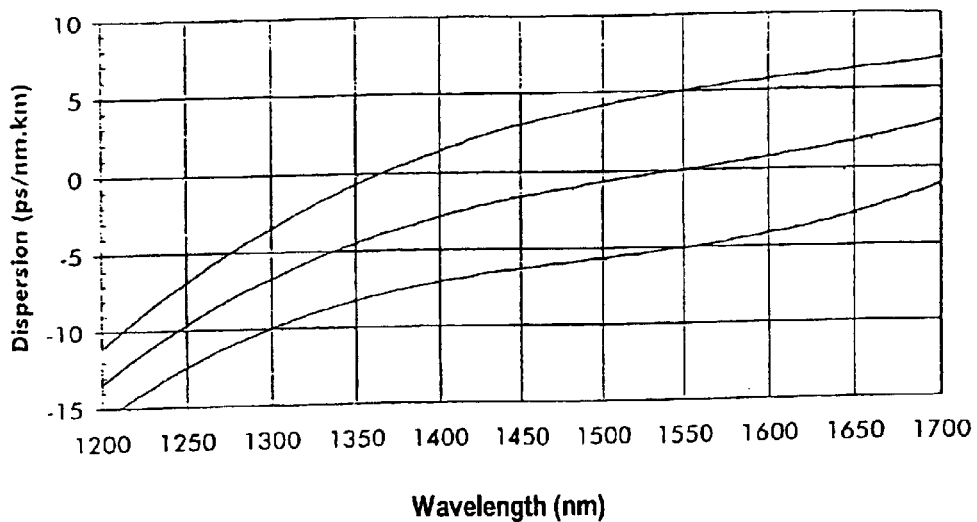
FIG_18
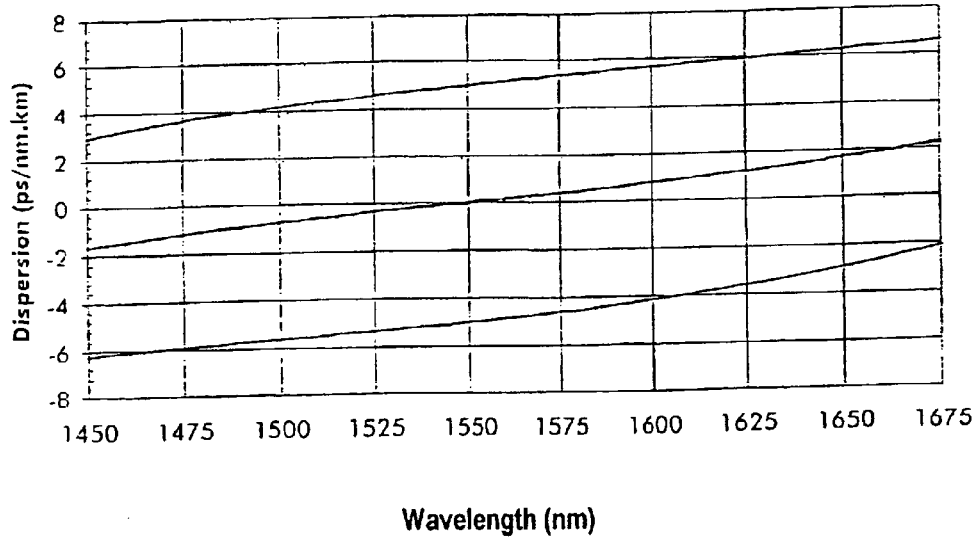

FIG_19
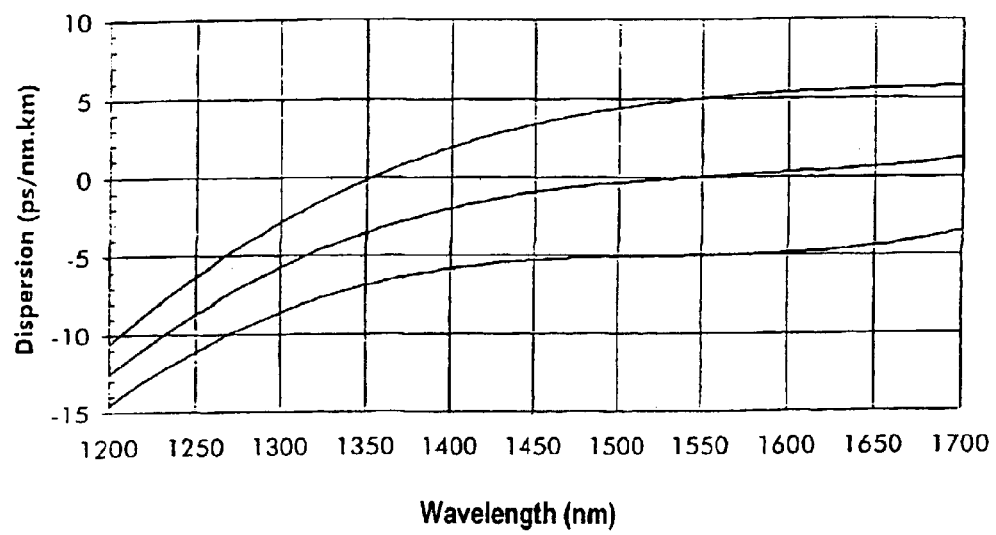
FIG_20
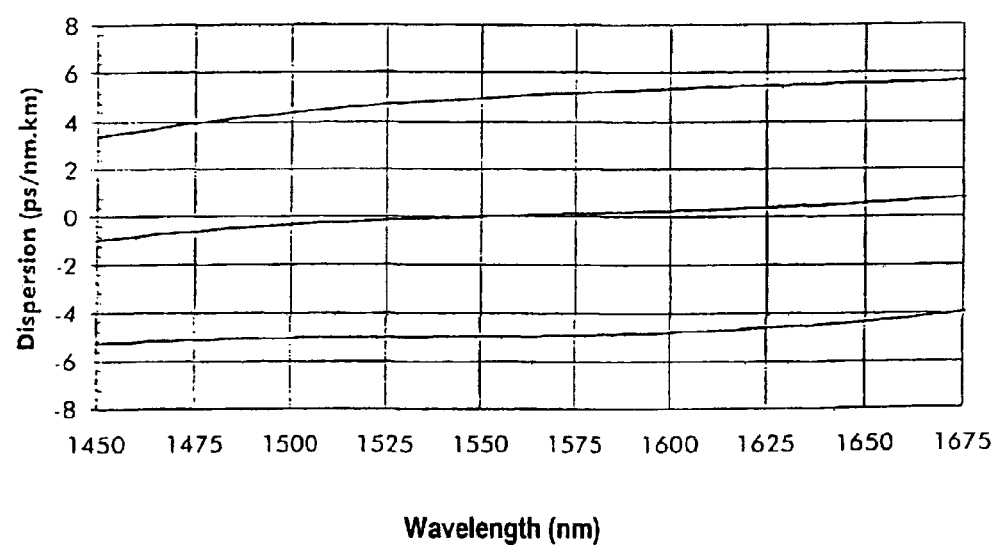

FIG_21
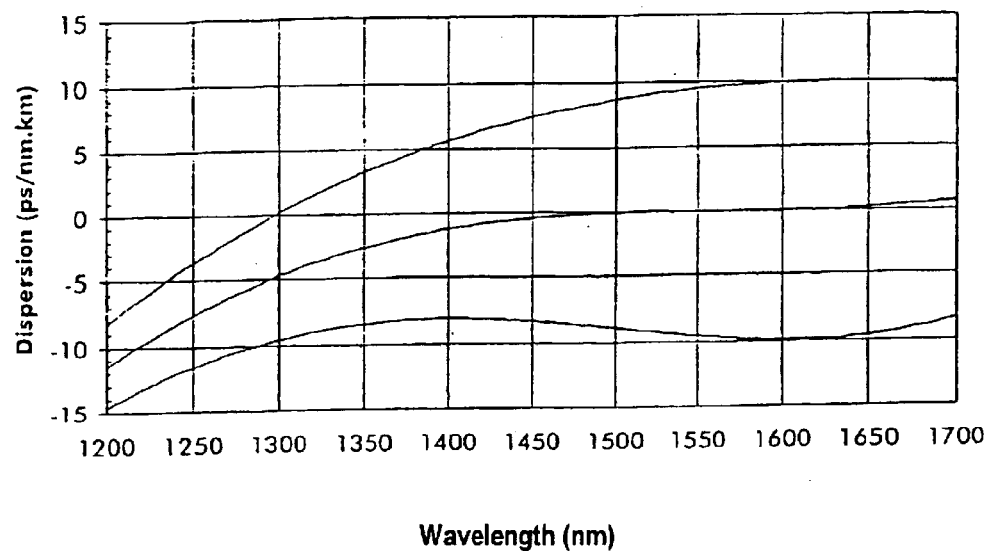
Wavelength (nm)
FIG_22
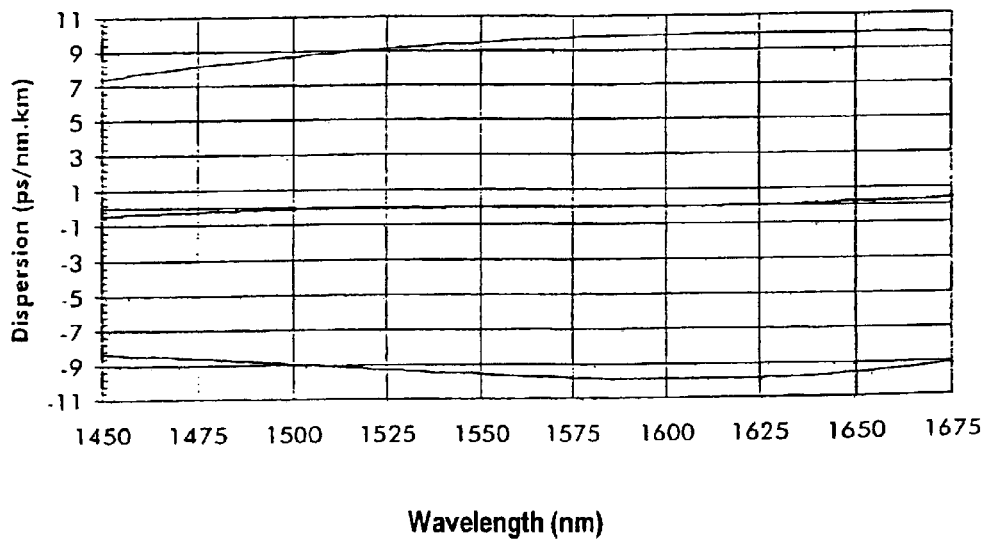
Wavelength (nm)

FIG_23
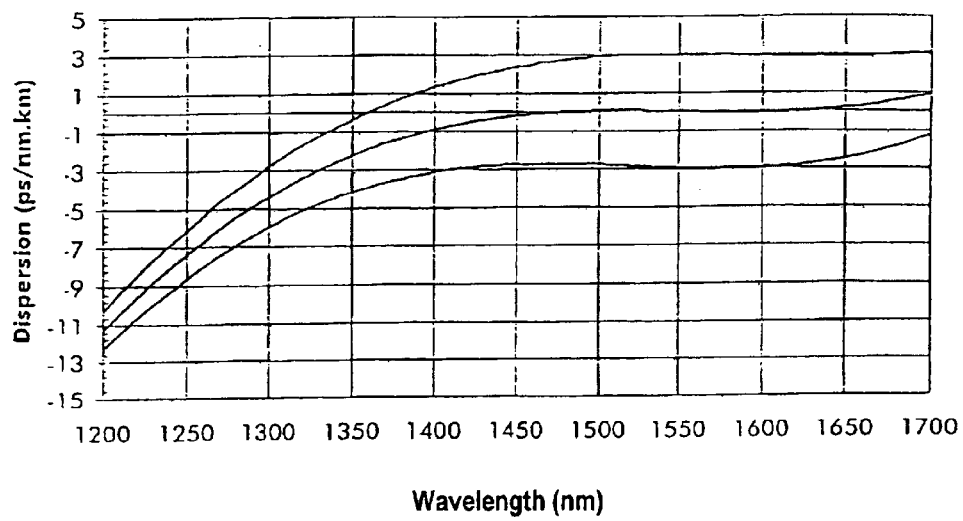
FIG_24
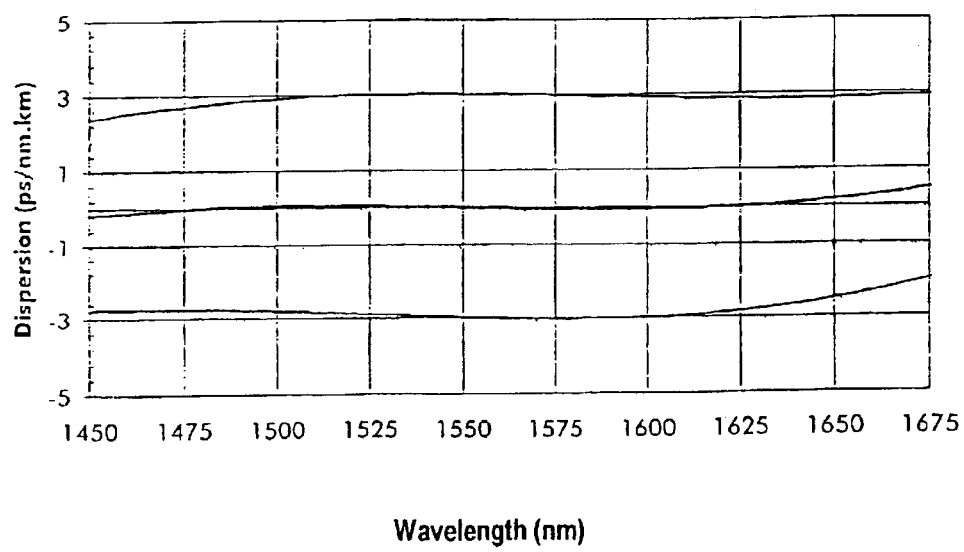

DISPERSION MANAGED OPTICAL FIBER

The field of the invention is that of optical fibers for use in wavelength division multiplex transmission networks.

The increase in information bit rates in this type of network imposes compensation of chromatic dispersion and chromatic dispersion slope over an increasingly wide spectral band. Band S comprises wavelengths from approximately 1460 nanometers (nm) to approximately 1530 nm. Band C comprises wavelengths from approximately 1530 nm to approximately 1565 nm. Band L comprises wavelengths from approximately 1565 nm to approximately 1625 nm. Band U comprises wavelengths from approximately 1625 nm to approximately 1675 nm. The spectral band most widely used is band C. There is an increasing tendency to use bands S and L and even band U in addition to band C.

Using a dispersion managed fiber (DMF) having a longitudinal alternation of optical fiber portions with positive chromatic dispersion and optical fiber portions with negative chromatic dispersion is known in the art. The chromatic dispersion for the whole of the dispersion managed optical fiber is therefore easily compensated for a given wavelength. However, if the spectral range in which the managed dispersion optical fiber is used increases, the chromatic dispersion must be compensated over a wide spectral range, which means that the chromatic dispersion slope must also be compensated; in practice chromatic dispersion slope compensation is much more difficult and often degrades other parameters of the dispersion managed fiber, such as its effective area.

Combining dispersion compensating fibers (DCF) with certain types of dispersion shifted optical fiber, also known as non-zero dispersion shifted fiber (NZ-DSF), to reduce crossed non-linear effects is also known in the art, and yields a transmission line with zero dispersion over a wide spectral range. A drawback of combining dispersion shifted fibers and dispersion compensating fibers is the high losses of the dispersion compensating fiber, especially its attenuation per unit length and bending losses, and the presence of a high level of polarization mode dispersion (PMD), which limits the increase in the information bit rate.

The solution proposed by the invention entails using a dispersion managed fiber in which the optical fiber portions have a dispersion slope such that, even in the absence of strict reversal of the chromatic dispersion slope between the optical fiber portions with positive chromatic dispersion and the optical fiber portions with negative chromatic dispersion, the resulting average dispersion of the dispersion managed optical fiber is very low, or even virtually zero, over a wide spectral range including bands S, C and L and preferably also including band U. This yields what might be called a "flat dispersion" dispersion managed optical fiber. The fact that strict reversal of the chromatic dispersion slope is not essential has the further advantage that the effective area does not collapse along the resulting dispersion managed optical fiber. Moreover, given the low chromatic dispersion slopes of the fiber portions, the alternating positive chromatic dispersion optical fiber portions and negative chromatic dispersion optical fiber portions can advantageously be obtained by means of a relationship of radial geometrical similarity of the index profile of the core, the ratio of the geometrical similarity remaining relatively low and not significantly degrading the properties of the resulting dispersion managed optical fiber, and in particular not significantly degrading the effective area on passing from a positive chromatic dispersion optical fiber portion to a negative chromatic dispersion optical fiber portion.

The invention provides a dispersion managed optical fiber for wavelength division multiplex transmission networks, the fiber including positive chromatic dispersion optical fiber portions alternating longitudinally with negative chromatic dispersion optical fiber portions and comprising in succession from the center towards the periphery a core having a varying index profile and then a cladding having a constant index, the outside radius of the index profile of the core, which is the limit between the core and the cladding, being sufficiently small for the optical fiber to function in monomode in-cable, each optical fiber portion having at a wavelength of 1550 nm a chromatic dispersion whose absolute value is from 1 ps/nm.km to 10 ps/nm.km, a chromatic dispersion slope whose absolute value is less than 0.015 ps/nm$^2$.km, and an effective area greater than 35 $\mu$m$^2$, the relative effective area difference at a wavelength of 1550 nm between the positive chromatic dispersion optical fiber portions and the negative chromatic dispersion optical fiber portions being less than 7%, and each optical fiber portion having bending losses at a wavelength of 1625 nm less than 0.1 dB for 100 turns with a diameter of 60 mm.

In a prior art "flat dispersion" dispersion managed optical fiber, the chromatic dispersion slope is reversed on passing between a positive chromatic dispersion optical fiber portion and a negative chromatic dispersion optical fiber portion by means of a high-ratio relationship of geometrical similarity of the index profile, which has the drawback of significantly reducing the effective area. To preserve a high effective area, a lower ratio is used for the geometrical similarity of the index profile, as a result of which the slope is not strictly reversed and the dispersion managed optical fiber is not of the "flat dispersion" type. In a dispersion managed optical fiber of the invention, because the slope of the positive dispersion optical fiber portion is already relatively low, it is easier to reverse the slope and, even if the slope is not strictly reversed, because it is low, the chromatic dispersion of the dispersion managed optical fiber obtained by alternating positive chromatic dispersion optical fiber portions and negative chromatic dispersion optical fiber portions is relatively "flat". This has two advantages in relation to the effective area in that, firstly, the effective area of the negative chromatic dispersion optical fiber portions is relatively high and, secondly, the effective area of the negative chromatic dispersion optical fiber portions is relatively close to the effective area of the positive chromatic dispersion optical fiber portions. This kind of "flat dispersion" optical fiber is known in the art, and is described in patent application WO 00/63732, but in the prior art the core index profile has a high outside radius, with the result that said optical fiber functions in-cable as a multimode fiber.

Dispersion managed optical fibers of the invention have an outside radius of the core index profile, which is the limit between the core and the cladding, that is sufficiently small for said optical fibers to function in-cable as monomode fibers. In the examples considered hereinafter, all of which correspond to core index profiles with three or four slices, the upper bound of this outside radius for the positive dispersion optical fiber portions and the negative dispersion optical fiber portions is made less than 16 micrometers ($\mu$m) for a profile with four slices and less than 10.5 $\mu$m for a profile with three slices, which ensures that the resulting "flat dispersion" dispersion managed optical fibers of the invention function in-cable as monomode fibers.

To minimize the effective area variation between the positive chromatic dispersion optical fiber portions and the negative chromatic dispersion optical fiber portions, the outside ratio difference between the positive chromatic dispersion optical fiber portions and the negative chromatic dispersion optical fiber portions is preferably less than 11%.

In a first preferred embodiment of the invention, the dispersion managed optical fiber of the invention comprises a first type of varying core index profile with three slices. The first type of varying core index profile comprises successively, from the center towards the periphery, a central slice having a maximum index higher than the index of the cladding, a buried slice having a minimum index lower than the index of the cladding, and an annular slice having a maximum index higher than the index of the cladding and less than the maximum index of the central slide. The central slice is preferably trapezium-shaped but it can also be rectangular, triangular or alpha-shaped.

A number of preferred ranges or relationships for the indices and the radii of the first type of core index profile for improving the spectral flatness of the chromatic dispersion of a dispersion managed optical fiber of the invention, and its other properties are given next.

The average of the difference $\Delta n1$ between the maximum index of the central slice and the index of the cladding is preferably from $7.00\times10^{-3}$ to $11.0\times10^{-3}$ in all the optical fiber portions and the average of the radius $r_1$ of the portion of the central slice having an index higher than the index of the cladding is preferably from 2.65 $\mu$m to 3.70 $\mu$m in all the optical fiber portions.

For an average portion of optical fiber whose index profile radius values correspond to the averages of the radius values of the index profiles of all the optical fiber portions, the value of the integral $$S_{01} = \int_0^{r1} \Delta n(r) \cdot dr$$

of the index difference relative to the index of the cladding between a zero radius and the radius $r_1$ of the portion of the central slice having an index higher than the index of the cladding is preferably higher than $23.0\times10^{-3}$ $\mu$m.

For an average portion of optical fiber whose index profile radius values correspond to the averages of the radius values of the index profiles of all the optical fiber portions, twice the value $$S_1 = 2 \cdot \int_0^{r1} \Delta n(r) \cdot r \cdot dr$$

of the integral of the product of the radius and the index difference relative to the index of the cladding between a zero radius and the radius $r_1$ of the portion of the central slice having an index higher than the index of the cladding is preferably from $58\times10^{-3}$ $\mu$m$^2$ to $99\times10^{-3}$ $\mu$m$^2$.

For an average portion of optical fiber whose index profile radius values correspond to the averages of the radius values of the index profiles of all the optical fiber portions, three times the value $$S_{11} = 3 \cdot \int_0^{r1} \Delta n(r) \cdot r^2 \cdot dr$$

of the integral of the product of the square of the radius and the index difference relative to the index of the cladding between a zero radius and the radius $r_1$ of the portion of the central slice having an index higher than the index of the cladding is preferably from $150\times10^{-3}$ $\mu$m$^3$ to $335\times10^{-3}$ $\mu$m$^3$.

The average of the difference $\Delta n2$ between the minimum index of the buried slice and the index of the cladding is preferably from $-9.0\times10^{-3}$ to $-2.5\times10^3$ in all the optical fiber portions (T+, T−) and the average of the outside radius $r_2$ of the buried slice is preferably from 4.00 $\mu$m to 8.10 $\mu$m in all the optical fiber portions.

For an average portion of optical fiber whose index profile radius values correspond to the averages of the radius values of the index profiles of all the optical fiber portions, the value of the integral $$S_{02} = \int_{r1}^{r2} \Delta n(r) \cdot dr$$

of the index difference relative to the index of the cladding between the radius $r_1$ of the portion of the central slice having an index higher than the index of the cladding and the outside radius $r_2$ of the buried slice is preferably from $22.0\times10^{-3}$ $\mu$m to $-8.0\times10^{-3}$ $\mu$m.

The average of the difference $\Delta n_3$ between the maximum index of the annular slice and the index of the cladding is preferably from $0.50\times10^{-3}$ to $7.5\times10^{-3}$ in all the optical fiber portions and the average of the outside radius $r_3$ of the annular slice is preferably from 6.70 $\mu$m to 10.50 $\mu$m in all the optical fiber portions.

For an average portion of optical fiber whose index profile radius values correspond to the averages of the radius values of the index profiles of all the optical fiber portions, the value of the integral $$S_{03} = \int_{r2}^{r3} \Delta n(r) \cdot dr$$

of the index difference relative to the index of the cladding between the outside radius $r_2$ of the buried slice and the outside radius $r_3$ of the annular slice is from $1.0\times10^{-3}$ $\mu$m to $15\times10^{-3}$ $\mu$m.

In a second preferred embodiment of the invention, the dispersion managed optical fiber of the invention has a second type of varying core index profile with four slices. The second type of varying core index profile comprises successively, from the center towards the periphery, a central slice having a maximum index higher than the index of the cladding, a first buried slice having a minimum index lower than the index of the cladding, an annular slice having a maximum index higher than the index of the cladding and lower than the maximum index of the central slice, and a second buried slice having a minimum index lower than the index of the cladding. The central slice is preferably rectangular but can also be trapezium-shaped, triangular or alpha-shaped.

A number of preferred ranges or relationships for the indices and the radii of the second type of core index profile for improving the spectral flatness of the chromatic dispersion of a dispersion managed optical fiber of the invention and its other properties are given next.

The average of the difference $\Delta n_1$ between the maximum index of the center slice and the index of the cladding is preferably from $7.0\times10^{-3}$ to $10.0\times10^{-3}$ in all the optical fiber portions and the average of the radius $r_1$ of the portion of the central slice having an index higher than the index of the cladding is preferably from 2.5 $\mu$m to 3.5 $\mu$m in all the optical fiber portions.

The average of the difference $\Delta n_2$ between the minimum index of the first buried slice and the index of the cladding is preferably from $-9.0\times10^{-3}$ to $-2.5\times10^{-3}$ in all the optical fiber portions and the average of the outside radius $r_2$ of the buried slice is preferably from 4.1 $\mu$m to 7.0 $\mu$m in all the optical fiber portions.

The average of the difference $\Delta n_3$ between the maximum index of the annular slice and the index of the cladding is preferably from $0.5\times10^{-3}$ to $5.0\times10^{-3}$ in all the optical fiber portions and the average of the outside radius $r_3$ of the annular slice is preferably from 9.0 µm to 13.0 µm in all the optical fiber portions.

The average of the difference $\Delta n_4$ between the minimum index of the second buried slice and the index of the cladding is from $-9.0\times10^{-3}$ to $-2.0\times10^{-3}$ in all the optical fiber portions and the average of the outside radius $r_4$ of the second buried slice is from 12.0 µm to 16.0 µm in all the optical fiber portions.

Along the dispersion managed optical fiber of the invention, passages between a positive chromatic dispersion optical fiber portion and a negative chromatic dispersion optical fiber portion are effected by means of a relationship of geometrical similarity of the core index profile. This relationship can be achieved in a number of ways. The dispersion managed optical fiber is preferably obtained by modifying the properties of a single preform. This modification can be achieved either by varying drawing of the preform followed by constant diameter fiber drawing or by varying diameter fiber drawing, for example. The dispersion managed optical fiber can also be obtained by concatenating lengths of optical fiber, alternating positive chromatic dispersion lengths and negative chromatic dispersion lengths, for example.

The invention will be better understood and other features and advantages will become apparent in the light of the following description and the appended drawings, which are provided by way of example, and in which:

FIG. 1 shows diagrammatically a dispersion managed optical fiber;

FIG. 2 shows diagrammatically a first type of profile with three slices of a dispersion managed optical fiber of the invention;

FIG. 3 is a table setting out average values of radii and index differences for ten examples of profiles of the first type of dispersion managed optical fiber of the invention;

FIG. 4 is a table showing extreme variations of the radii from FIG. 3 relative to their average values and certain properties of the corresponding profiles of dispersion managed optical fiber of the invention;

FIG. 5 is a table setting out average values of radii and index differences for five further examples of profiles of the first type of dispersion managed optical fiber of the invention;

FIG. 6 is a table showing extreme variations of the radii from FIG. 5 relative to their average values and certain properties of the corresponding profiles of dispersion managed optical fiber of the invention;

FIG. 7 is a table setting out other properties of profiles of dispersion managed optical fiber of the invention as defined in FIG. 4;

FIG. 8 is a table setting out other properties of profiles of dispersion managed optical fiber of the invention as defined in FIG. 6;

FIG. 9 is a table setting out averages of properties of profiles of dispersion managed optical fiber of the invention as defined in FIGS. 7 and 8;

FIG. 10 shows diagrammatically a second type of profile with four slices of a dispersion managed optical fiber of the invention;

FIG. 11 is a table setting out average values of radii and index differences for ten examples of profiles of the second type of dispersion managed optical fiber of the invention;

FIG. 12 is a table showing extreme variations of the radii from FIG. 11 relative to their average values and certain properties of the corresponding profiles of dispersion managed optical fiber of the invention;

FIG. 13 is a table setting out other properties of profiles of dispersion managed optical fiber of the invention as defined in FIG. 12;

FIG. 14 is a table setting out averages of properties of profiles of dispersion managed optical fiber of the invention as defined in FIG. 13;

FIG. 15 shows diagrammatically, over a wide spectral range, positive, average and negative chromatic dispersion variations for Example 4 as defined in FIGS. 3 and 4;

FIG. 16 is a diagrammatic enlargement of FIG. 15 over a narrower spectral range;

FIG. 17 shows diagrammatically, over a wide spectral range, positive, average and negative chromatic dispersion variations for Example 5 as defined in FIGS. 3 and 4;

FIG. 18 is a diagrammatic enlargement of part of FIG. 17 over a narrower spectral range;

FIG. 19 shows diagrammatically, over a wide spectral range, positive, average and negative chromatic dispersion variations for Example 7 as defined in FIGS. 3 and 4;

FIG. 20 is a diagrammatic enlargement of part of FIG. 19 over a narrower spectral range;

FIG. 21 shows diagrammatically, over a wide spectral range, positive, average and negative chromatic dispersion variations for Example 10 as defined in FIGS. 3 and 4;

FIG. 22 is a diagrammatic enlargement of part of FIG. 21 over a narrower spectral range;

FIG. 23 shows diagrammatically, over a wide spectral range, positive, average and negative chromatic dispersion variations for Example 20 as defined in FIGS. 11 and 12;

FIG. 24 is a diagrammatic enlargement of part of FIG. 23 over a narrower spectral range.

FIG. 1 is a diagram showing a dispersion managed optical fiber. The dispersion managed optical fiber 1 includes an alternation of portions T+ of positive chromatic dispersion optical fiber and portions T− of negative chromatic dispersion optical fiber. For simplicity, FIG. 1 shows only four portions, but the optical fiber 1 can include many more portions. Between two T+ portions 11 and 13 there is a T− portion 12. Between two T− portions 12 and 14 there is a T+ portion 13. The T+ and T− portions are the same length, for example.

FIG. 2 shows diagrammatically a first type of profile, with three slices, of a dispersion managed optical fiber of the invention. The first slice, known as the central slice, has a maximum index difference $\Delta n1$ relative to the constant index of the cladding and an outside radius r1b. The maximum index difference $\Delta n1$ is positive. Between a zero radius and a radius r1a, the index is preferably constant and at a maximum; it reaches the index of the cladding for a value r1 of the radius and the index of the second slice for a value r1b. If r1a is not zero and r1a is different from r1b, the first slice is trapezium-shaped. If r1a is not zero and r1a is equal to r1b, the first slice is rectangular. If r1a is zero and r1b is not zero, the first slice is triangular. The second slice, known as the buried slice, has a maximum index difference $\Delta n2$ relative to the constant index of the cladding and an outside radius r2. The maximum index difference $\Delta n2$ is negative. The index is preferably constant between the radius r1b and the radius r2. The third slice, known as the annular slice, has a maximum index difference $\Delta n3$ relative to the constant index of the cladding and an outside radius r3. The maximum index difference $\Delta n3$ is positive. The index is preferably constant between the radius r2 and the radius r3. Beyond the radius r3 is the constant index cladding.

FIG. 3 is a table containing average values of radii and index differences for ten examples of profiles of the first type of dispersion managed optical fiber of the invention. The left-hand column identifies Examples 1 to 10. The suffix i ("initial") indicates that the radius values given are for an average between the radii of the T+ portions and the radii of the T− portions. The next four columns give the radii in μm of the varying core index profile. The last three columns give one thousand times the index difference (no units).

FIG. 4 is a table giving extreme variations of the radii from FIG. 3 relative to their average values and certain properties of the corresponding profiles of dispersion managed optical fiber of the invention. The left-hand column identifies Examples 1 to 10. The suffix a corresponds to a T+ portion obtained from corresponding values of the subscript i by applying a relationship of geometrical similarity whose ratio is the sum of 1 and the value of the parameter VarRay expressed as a percentage; for example, if the value of VarRay is 0.91%, the ratio of geometrical similarity is 1.0091. The suffix b corresponds to a T− portion obtained from corresponding values of the subscript i by applying a relationship of geometrical similarity whose ratio is the sum of 1 and the value of the parameter VarRay expressed as a percentage; for example, if the value of VarRay is −0.91%, the ratio of geometrical similarity is 0.9909. The parameter VarRay is given in the second column. For each example considered, the other columns represent properties of the optical fiber portion corresponding to the example in question. The next column gives the theoretical cut-off wavelength $\lambda_{cth}$ expressed in nanometers. The next column gives the mode diameter $2W_{02}$ expressed in μm at the wavelength of 1550 nm. The next column gives the effective area expressed in μm². The next column gives the chromatic dispersion cancellation wavelength $\lambda_0$ expressed in nm. The next column gives the chromatic dispersion C expressed in ps/nm·km at a wavelength of 1550 nm. The next column gives the chromatic dispersion slope C expressed in ps/nm²·km at a wavelength of 1550 nm. The next column gives the maximum bending loss thresholds PC expressed in decibels (dB) for 100 turns with a diameter of 60 millimeters (mm) at a wavelength of 1625 nm. For Example 1a, said bending losses are less than $3 \times 10^{-4}$ dB, for example. The last column gives the microbending sensitivity at a wavelength of 1550 nm, expressed as a proportion of that of our G652 fiber.

FIG. 5 is a table giving average values of radii and index differences for five further examples of profiles of the first type of dispersion managed optical fiber of the invention. Its description is analogous to that of FIG. 3.

FIG. 6 is a table giving extreme variations of the radii from FIG. 5 relative to their average values and certain properties of the corresponding profiles of dispersion managed optical fiber of the invention. Its description is analogous to that of FIG. 4.

FIG. 7 is a table giving other properties of the profiles of dispersion managed optical fiber of the invention as defined in FIG. 4. The left-hand column identifies the examples, as already explained. For each example considered, the other columns give properties of the optical fiber portion corresponding to the example in question. The next four columns give effective areas $S_{eff}$ expressed in μm² at the respective wavelengths of 1460 nm, 1500 nm, 1625 nm and 1675 n. The next four columns give the chromatic dispersion C expressed in ps/nm·km at the respective wavelengths 1460 nm, 1500 nm, 1625 nm and 1675 nm. The next three columns give maximum bending loss thresholds expressed in dB/m for a radius of 10 mm at the respective wavelengths 1500 nm, 1625 nm and 1675 nm. In Example 1a, for example, said bending losses are less than 5 dB/m. The next three columns give maximum bending loss thresholds expressed in dB/m for a radius of 30 mm at the respective wavelengths 1500 nm, 1625 nm and 1675 nm.

FIG. 8 is a table containing other properties of the profiles of dispersion managed optical fiber of the invention as defined in FIG. 6. Its description is analogous to that of FIG. 7.

FIG. 9 is a table containing average values of the properties of the profiles of dispersion managed optical fiber of the invention as defined in FIGS. 7 and 8. The left-hand column identifies Examples 1 to 15. The suffix m indicates that the properties represented in the other columns correspond to averages between the T+ portions and the T− portions for the same example but with the suffixes a and b. For example, the properties of Example 1m are the averages of the properties of Examples 1a and 1b. For each example considered, the other columns represent properties of the optical fiber portion corresponding to the example in question. The next four columns give effective areas $S_{eff}$ expressed in μm² at the respective wavelengths 1460 nm, 1500 nm, 1625 nm and 1675 nm. The column gives the effective area difference $\Delta S_{eff}$ expressed in μm² between the wavelengths 1460 nm and 1625 nm. The next four columns give chromatic dispersions C expressed in ps/nm·km at the respective wavelengths 1460 nm, 1500 nm, 1625 nm and 1675 nm. The last column gives the chromatic dispersion difference ΔC expressed in ps/nm·km between the wavelengths 1460 nm and 1625 nm.

FIG. 10 shows diagrammatically a second type of profile with four slices of a dispersion managed optical fiber of the invention. The first slice, known as the central slice, has a maximum index difference Δn1 relative to the constant index of the cladding and an outside radius r1. The maximum index difference Δn1 is positive. The index is preferably constant between a zero radius and the radius r1. The second slice, known as the first buried slice, has a maximum index difference Δn2 relative to the constant index of the cladding and an outside radius r2. The maximum index difference Δn2 is negative. The index is preferably constant between the radius r1 and the radius r2. The third slice, known as the annular slice, has a maximum index difference Δn3 relative to the constant index of the cladding and an outside radius r3. The maximum index difference Δn3 is positive. The index is preferably constant between the radius r2 and the radius r3. The fourth slice, known as the second buried slice, has a maximum index difference Δn4 relative to the constant index of the cladding and an outside radius r4. The maximum index difference Δn4 is negative. The index is preferably constant between the radium r3 and the radius r4. Beyond the radius r4 is the constant index cladding.

FIG. 11 is a table giving average values of radii and index differences for ten examples of profiles of the second type of dispersion managed optical fiber of the invention. Its description is analogous to that of FIG. 3.

FIG. 12 is a table giving extreme variations of the radii from FIG. 11 relative to their average values and certain properties of the corresponding profiles of dispersion managed optical fiber of the invention. Its description is analogous to that of FIG. 4.

FIG. 13 is a table containing other properties of the profiles of dispersion managed optical fiber of the invention as defined in FIG. 12. Its description is analogous to that of FIG. 7.

FIG. 14 is a table containing average values of the properties of profiles of dispersion managed optical fiber of the invention as defined in FIG. 13. Its description is analogous to that of FIG. 9.

FIG. 15 shows diagrammatically, over a wide spectral range, positive, average and negative chromatic dispersion variations for Example 4 as defined in FIGS. 3 and 4. The curves a, m and b represent chromatic dispersion expressed in ps/nm·km over a spectral range of wavelengths from 1200 nm to 1700 nm, respectively for the T+ portions, for the T− portions, and for the average between the T+ and T− portions corresponding to the overall chromatic dispersion of the optical fiber 1 comprising alternating T+ and T− portions. FIG. 15 relates to Example 4.

FIG. 16 shows diagrammatically an enlargement of FIG. 15 over a narrower spectral range. The same curves are shown as in FIG. 15, over the narrower spectral range from 1450 nm to 1675 nm. It can be seen that the chromatic dispersion slope of the resulting dispersion managed optical fiber is "flat" (curve m); in FIG. 16 the chromatic dispersion remains between 0.5 ps/nm·km and −1 ps/nm·km.

FIG. 17 shows diagrammatically, over a wide spectral range, positive, average and negative chromatic dispersion variations for Example 5 as defined in FIGS. 3 and 4. Its description is analogous to that of FIG. 15.

FIG. 18 shows diagrammatically an enlargement of a portion of FIG. 17 over a narrower spectral range. Its description is analogous to that of FIG. 16.

FIG. 19 shows diagrammatically, over a wide spectral range, positive, average and negative chromatic dispersion variations for Example 7 as defined in FIGS. 3 and 4. Its description is analogous to that of FIG. 15.

FIG. 20 shows diagrammatically an enlargement of a portion of FIG. 19 over a narrower spectral range. Its description is analogous to that of FIG. 16.

FIG. 21 shows diagrammatically, over a wide spectral range, positive, average and negative chromatic dispersion variations for Example 10 as defined in FIGS. 3 and 4. Its description is analogous to that of FIG. 15.

FIG. 22 shows diagrammatically an enlargement of a portion of FIG. 21 over a narrower spectral range. Its description is analogous to that of FIG. 16.

FIG. 23 shows diagrammatically, over a wide spectral range, positive, average and negative chromatic dispersion variations for Example 20 as defined in FIGS. 11 and 12. Its description is analogous to that of FIG. 15.

FIG. 24 shows diagrammatically an enlargement of a portion of FIG. 23 over a narrower spectral range. Its description is analogous to that of FIG. 16.

Dispersion managed optical fiber of the invention preferably has an attenuation less than or equal to 0.35 dB/km at a wavelength of 1550 nm.

Dispersion managed optical fiber of the invention preferably has a polarization mode dispersion less than or equal to 0.2 ps/km$^{1/2}$ at a wavelength of 1550 nm, more preferably less than or equal to 0.1 ps/km$^{1/2}$, or even more preferably less than or equal to 0.05 ps/km$^{1/2}$ The dispersion managed optical fiber of the invention preferably has bending losses of less than 400 dB/m at a wavelength of 1625 nm as measured for a radius of 10 mm in any of the portions constituting said optical fiber.

What is claimed is:

1. A dispersion managed optical fiber,
   for wavelength division multiplex transmission networks,
   the fiber including positive chromatic dispersion optical fiber portions (T+) alternating longitudinally with negative chromatic dispersion optical fiber portions (T−),
   the fiber comprising in succession from the center towards the periphery a core having a varying index profile and then a cladding having a constant index,
   the outside radius of the index profile of the core, which is the limit between the core and the cladding, being sufficiently small for the optical fiber to function in monomode in-cable,
   each optical fiber portion (T+, T−) having at a wavelength of 1550 nm a chromatic dispersion whose absolute value is from 1 ps/nm.km to 10 ps/nm.km, a chromatic dispersion slope whose absolute value is less than 0.0015 ps/nm$^2$.km, and an effective area greater than 35 $\mu$m$^2$,
   the relative effective area difference at a wavelength of 1550 nm between the positive chromatic dispersion optical fiber portions (T+) and the negative chromatic dispersion optical fiber portions (T−) being less than 7%, and
   each optical fiber portion (T+, T−) having bending losses at a wavelength of 1625 nm less than 0.1 dB for 100 turns with a diameter of 60 mm.

2. A dispersion managed optical fiber according to claim 1, wherein the average of the outside radius ($r_3$) of the index profile of the core, which is the limit between the core and the cladding, is less than 10.5 $\mu$m$^2$ in all the optical fiber portions (T+, T−), and in that the index profile of the core comprises three slices.

3. A dispersion managed optical fiber according to claim 2, wherein the varying index profile of the core comprises successively, from the center towards the periphery,
   a central slice having a maximum index higher than the index of the cladding,
   a buried slice having a minimum index lower than the index of the cladding, and
   an annular slice having a maximum index higher than the index of the cladding and lower than the maximum index of the central slice.

4. A dispersion managed optical fiber according to claim 3, wherein the central slice is trapezium-shaped or alpha-shaped.

5. A dispersion managed optical fiber according to claim 3,
   wherein the average of the difference ($\Delta n1$) between the maximum index of the central slice and the index of the cladding is from $7.00 \times 10^{-3}$ to $11.0 \times 10^{-3}$ in all the optical fiber portions (T+, T−),
   and wherein the average of the radius (r1) of the portion of the central slice having an index higher than the index of the cladding is from 2.65 $\mu$m to 3.70 $\mu$m in all the optical fiber portions (T+, T−).

6. A dispersion managed optical fiber according to claim 5, wherein, for an average portion of optical fiber whose index profile radius values correspond to the averages of the radius values of the index profiles of all the optical fiber portions (T+, T), the value of the integral $$\left(S_{01} = \int_0^{r1} \Delta n(r) \cdot dr\right)$$

of the index difference relative to the index of the cladding between a zero radius and the radius ($r_1$) of the portion of the central slice having an index higher than the index of the cladding is greater than $23.0 \times 10^{-3}$ $\mu$m.

7. A dispersion managed optical fiber according to claim 6, wherein, for an average portion of optical fiber whose index profile radius values correspond to the averages of the radius values of the index profiles of all the optical fiber portions (T+, T), twice the value $$\left(S_1 = 2 \cdot \int_0^{r1} \Delta n(r) \cdot r \cdot dr\right)$$

of the integral of the product of the radius and the index difference relative to the index of the cladding between a zero radius and the radius (r1) of the portion of the central slice having an index higher than the index of the cladding is from $58\times10^{-3}$ $\mu m^2$ to $99\times10^{-3}$ $\mu m^2$.

8. A dispersion managed optical fiber according to claim 7, wherein, for an average portion of optical fiber whose index profile radius values correspond to the averages of the radius values of the index profiles of all the optical fiber portions (T+, T), three times the value $$\left(S_{11} = 3 \cdot \int_0^{r1} \Delta n(r) \cdot r^2 \cdot dr\right)$$

of the integral of the product of the square of the radius and the index difference relative to the index of the cladding between a zero radius and the radius ($r_1$) of the portion of the central slice having an index higher than the index of the cladding is from $150\times10^{-3}$ $\mu m^3$ to $335\times10^{-3}$ $\mu m^3$.

9. A dispersion managed optical fiber according to claim 5,
wherein the average of the difference ($\Delta n2$) between the minimum index of the buried slice and the index of the cladding is from $-9\times10^{-3}$ and $-2.5\times10^{-3}$ over all the optical fiber portions (T+, T)
and wherein the average of the outside radius ($r_2$) of the buried slice is from $4.00$ $\mu m$ to $8.10$ $\mu m$ in all the optical fiber portions (T+, T-).

10. A dispersion managed optical fiber according to claim 9, wherein, for an average portion of optical fiber whose index profile radius values correspond to the averages of the radius values of the index profiles of all the optical fiber portions (T+, T-), the value of the integral $$\left(S_{02} = \int_{r1}^{r2} \Delta n(r) \cdot dr\right)$$

of the index difference relative to the index of the cladding between the radius ($r_1$) of the portion of the central slice having an index higher than the index of the cladding and the outside radius ($r_2$) of the buried slice is from $22.0\times10^{-3}$ $\mu m$ to $-8.0\times10^{-3}$ $\mu m$.

11. A dispersion managed optical fiber according to claim 9,
wherein the average of the difference ($\Delta n_3$) between the maximum index of the annular slice and the index of the cladding is from $0.50\times10^{-3}$ to $7.5\times10^{-3}$ over all the optical fiber portions (T+, T-),
and wherein the average of the outside radius ($r_3$) of the annular slice is from $6.70$ $\mu m$ to $10.50$ $\mu m$ in all the optical fiber portions (T+, T-).

12. A dispersion managed optical fiber according to claim 11, wherein, for an average portion of optical fiber whose index profile radius values correspond to the averages of the radius values of the index profiles of all the optical fiber portions (T+, T-), the value of the integral $$\left(S_{03} = \int_{r2}^{r3} \Delta n(r) \cdot dr\right)$$

of the index difference relative to the index of the cladding between the external radius ($r_2$) of the buried slice and the external radius ($r_3$) of the annular slice is from $1.0\times10^{-3}$ $\mu m$ to $15\times10^3$ $\mu m$.

13. A dispersion managed optical fiber according to claim 1, wherein the average of the outside radius ($r_4$) of the index profile of the core, which is the limit between the core and the cladding, is less than 16 $\mu m$ in all the optical fiber portions (T+, T-) and in that the index profile of the core comprises four slices.

14. A dispersion managed optical fiber according to claim 13, wherein the varying index profile of the core comprises successively, from the center towards the periphery,
a central slice having a maximum index higher than the index of the cladding,
a first buried slice having a minimum index lower than the index of the cladding,
an annular slice having a maximum index higher than the index of the cladding and lower than the maximum index of the central slice, and
a second buried slice having a minimum index lower than the index of the cladding.

15. A dispersion managed optical fiber according to claim 14,
wherein the average (T+, T-) of the difference ($\Delta n_1$) between the maximum index of the center slice and the index of the cladding is from $7.0\times10^{-3}$ to $10.0\times10^{-3}$ in all the optical fiber portions,
and wherein the average of the radius ($r_1$) of the portion of the central slice having an index higher than the index of the cladding is from 2.5 $\mu m$ to 3.5 $\mu m$ in all the optical fiber portions (T+, T-).

16. A dispersion managed optical fiber according to claim 15,
wherein the average of the difference ($\Delta n_2$) between the maximum index of the first buried slice and the index of the cladding is from $-9.0\times10^{-3}$ to $-2.5\times10^{-3}$ in all the optical fiber portions (T+, T-),
and wherein the average of the outside radius ($r_2$) of the buried slice is from 4.1 $\mu m$ to 7.0 $\mu m$ in all the optical fiber portions (T+, T-).

17. A dispersion managed optical fiber according to claim 16,
wherein the average of the difference ($\Delta n_3$) between the maximum index of the annular slice and the index of the cladding is from $0.5\times10^{-3}$ to $5.0\times10^{-3}$ in all the optical fiber portions (T+, T-),
and wherein the average of the outside radius ($r_3$) of the annular slice is from 9.0 $\mu m$ to 13.0 $\mu m$ in all the optical fiber portions (T+, T-).

18. A dispersion managed optical fiber according to claim 17,
wherein the average of the difference ($\Delta n_4$) between the minimum index of the second buried slice and the index of the cladding is from $-9.0\times10^{-3}$ to $-2.0\times10^{-3}$ in all the optical fiber portions (T+, T-),
and wherein the average of the outside radius ($r_4$) of the second buried slice is from 12.0 $\mu m$ to 16.0 $\mu m$ in all the optical fiber portions (T+, T-).

19. A dispersion managed optical fiber according to claim 1, wherein said dispersion managed optical fiber is obtained by modifying the properties of a single preform.

20. A dispersion managed optical fiber according to claim 1, wherein the relative outside radius difference between the positive chromatic dispersion optical fiber portions and the positive negative chromatic dispersion optical fiber portions is made less than 11%.

21. A dispersion managed optical fiber according to claim 1, wherein the optical fiber has an attenuation less than or equal to 0.35 dB/km at a wavelength of 1550 nm.

22. A dispersion managed optical fiber according to claim 1, wherein the optical fiber has a polarization mode dispersion less than or equal to 0.2 ps/km$^{1/2}$ at a wavelength of 1550 nm.

23. A dispersion managed optical fiber according to claim 1, wherein the optical fiber has bending losses less than 400 dB/m at a wavelength of 1625 nm as measured for a radius of 10 mm in any of the portions constituting said optical fiber.

* * * * *